(12) United States Patent
Colavito et al.

(10) Patent No.: US 7,079,486 B2
(45) Date of Patent: Jul. 18, 2006

(54) ADAPTIVE THRESHOLD BASED JITTER BUFFER MANAGEMENT FOR PACKETIZED DATA

(75) Inventors: Leonard Raymond Colavito, Newtown, PA (US); Liang Jin, Macungie, PA (US); Kevin R. Kinney, Coopersburg, PA (US); Rong Wang, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 914 days.

(21) Appl. No.: 10/074,841

(22) Filed: Feb. 13, 2002

(65) Prior Publication Data

US 2003/0152094 A1 Aug. 14, 2003

(51) Int. Cl.
*H04L 12/24* (2006.01)

(52) U.S. Cl. .................. 370/231; 370/235; 370/252

(58) Field of Classification Search .............. 370/230, 370/230.1, 231–235, 252, 400, 401, 394; 709/231, 232
See application file for complete search history.

(56) References Cited

U.S. PATENT DOCUMENTS

| | | | |
|---|---|---|---|
| 6,072,809 A | 6/2000 | Agrawal et al. | |
| 6,094,692 A * | 7/2000 | Kalkunte | 710/34 |
| 6,157,653 A | 12/2000 | Kline et al. | |
| 6,259,677 B1 | 7/2001 | Jain | |
| 6,452,950 B1 * | 9/2002 | Ohlsson et al. | 370/516 |
| 6,658,027 B1 * | 12/2003 | Kramer et al. | 370/516 |
| 6,700,895 B1 * | 3/2004 | Kroll | 370/412 |
| 6,862,298 B1 * | 3/2005 | Smith et al. | 370/516 |
| 6,965,566 B1 * | 11/2005 | Kawasaki et al. | 370/235 |

* cited by examiner

*Primary Examiner*—Huy D. Vu
*Assistant Examiner*—Duc Duong (57) ABSTRACT

Adaptive jitter buffer management, e.g., for playout of packetized data transmitted over a network. Playout delay is iteratively adjusted based on changing network traffic characteristics by varying the release threshold in a jitter buffer. The adjustment is carried out by evaluating three quantities: (1) average packet transit time over the network; (2) jitter of the packet transit time; and (3) additional waiting time due to the presence of out-of-sequence packets. This invention reduces negative effects of jitter and/or transmission irregularities, such as late arrival of packets and out-of-sequence packets, while maintaining relatively low playout delay and relatively high quality of service.

38 Claims, 5 Drawing Sheets

ADAPTIVE THRESHOLD BASED JITTER BUFFER MANAGEMENT FOR PACKETIZED DATA

BACKGROUND OF THE INVENTION

1. Field of the Invention

The present invention relates to the field of telecommunications and, more specifically, to managing real-time data packet receipt and playout in the presence of variable packet delays.

2. Description of the Related Art

Real-time digital audio for Internet telephony and playback for World Wide Web browsers employs packetized audio data that is transferred over a network. Each packet contains information that allows the data network to route it to the appropriate destination. Packets from many different transmitters travel sequentially over single connections between routing points (nodes), and packets from the same transmitter (source) may travel different paths through nodes of the network. Consequently, each packet in a sequence of packets from a specific source to a specific receiver (destination) may experience a different delay as it travels through its path through the network. Delay variation also occurs as the packets experience different competing traffic loads at nodes along the network. This variation in delay is termed "jitter."

In addition to the uneven arrival of packets, jitter may also cause out-of-sequence packets. An out-of-sequence packet occurs when the order of the sequence of packets arriving at the destination differs from the order in which the sequence of packets was transmitted by the source. For overall perceived playback quality at the destination, it is preferable to play out voice packets in the correct order at a constant rate and without excessive delays. Hence, network jitter that is not compensated for may significantly degrade the quality of voice service (e.g., in a two-way conversation). One method to compensate for the network jitter is to introduce a jitter buffer at the destination receiver.

Figure 1:
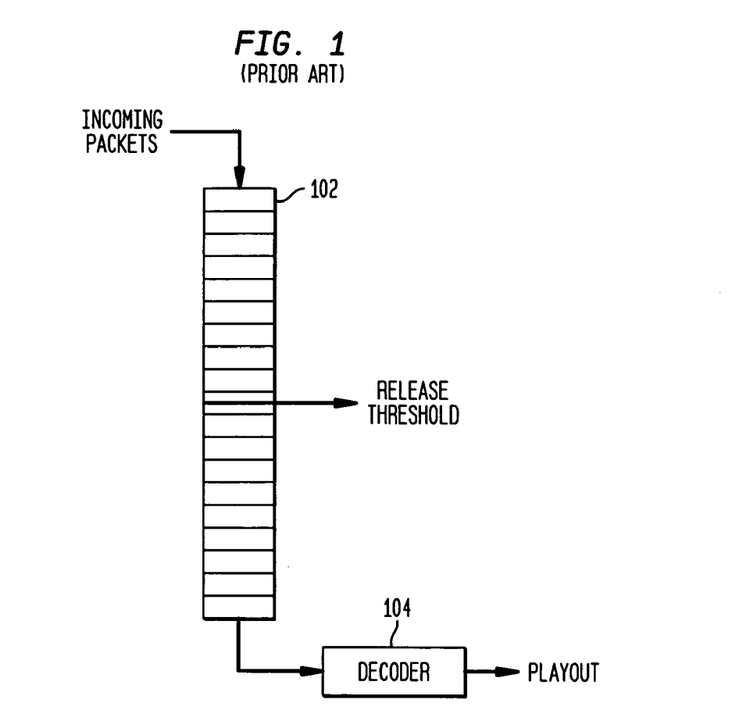
FIG. 1 is a block diagram of a prior art jitter-buffering system.

FIG. 1 is a block diagram of a prior art jitter-buffering system for audio delivery, e.g., voice over Internet Protocol (VoIP), and continuous playback at an audio receiver. When an initial (first) packet arrives at the receiver, it is enqueued into a jitter buffer 102 and is not played out immediately. Instead, the initial packet is held in buffer 102 for a predetermined amount of time (referred to as the release threshold) before being forwarded to a decoder 104 for playout. After the first packet is played out, subsequent packets are played out at uniform time intervals.

It is preferable to keep the release threshold at a minimum for two reasons. First, the jitter buffer at the receiver, such as buffer 102, is of finite length (i.e., it can only hold a fixed number of packets). Therefore, buffer overflow (resulting in loss or dropping of incoming packets) should be avoided. Second, as mentioned above, the total "end-to-end" delay may be perceivable by network users. If the total delay of the voice path exceeds approximately 200 msec, the conversation may be perceived as lagging (having low quality). Longer delays can noticeably disrupt interactive communications and significantly impair human conversations. Thus, the total end-to-end delay should preferably be less than 200 msec. However, if the release threshold is too low, then "slower" packets will not arrive before their designated playout time, causing buffer underflow and degrading the quality of voice transmission.

SUMMARY OF THE INVENTION

Observed network delay and jitter characteristics may change rapidly over time as other connections are set up and taken down in the network. Thus, a jitter buffering method is desirable that can (i) control jitter buffer underflows/overflows at a receiver in a packet-switched network; (ii) provide a simple mechanism to minimize playout delay; (iii) adapt to changing network delay characteristics; and (iv) adjust for other network impairments, such as dropped packets or out-of-sequence packets.

The present invention relates to adaptive jitter buffer management for playout of packetized voice data transmitted over a network. Playout delay is iteratively adjusted based on changing network traffic characteristics by varying the release threshold in a jitter buffer. The adjustment is carried out by evaluating three quantities: (1) integral of the variation in the packet transit time over the network; (2) jitter of the packet transit time; and (3) additional waiting time due to the presence of out-of-sequence packets. This invention reduces negative effects of jitter and/or transmission irregularities, such as late arrival of packets and out-of-sequence packets, while maintaining relatively low playout delay and relatively high quality of service.

According to one embodiment, the present invention is, in a receiver, a method for processing data packets transmitted from a transmitter over a network, the method comprising the steps of: (A) storing each received data packet in a buffer; (B) dynamically updating a first threshold value based on (i) variation in packet transit time over the network and (ii) data packets arriving out-of-sequence at the receiver; (C) performing a comparison based on a waiting time of a data packet and the first threshold value; and (D) transmitting the data packet from the buffer for further processing in the receiver based on the comparison of step (C).

According to another embodiment, the present invention is, in a receiver, a buffer for processing data packets transmitted from a transmitter over a network, wherein the buffer is configured to (A) store each received data packet; (B) dynamically update a first threshold value based on (i) variation in packet transit time over the network and (ii) data packets arriving out-of-sequence at the receiver; (C) perform a comparison based on a waiting time of a data packet and the first threshold value; and (D) transmit the data packet from the buffer for further processing in the receiver based on the comparison.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The description herein is largely based on a particular jitter buffer for playing out real-time audio data. Those skilled in the art can appreciate that the description can be equally applied to other jitter buffers and/or other types of real-time data.

Figure 2:
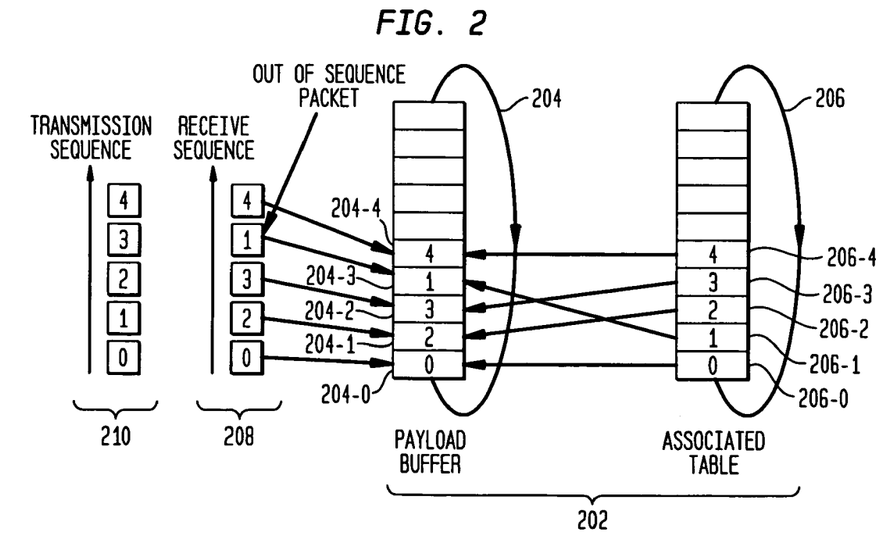
FIG. 2 shows a jitter buffer according to one embodiment of the present invention.

FIG. 2 shows a diagram of a jitter buffer 202 according to one embodiment of the present invention. Jitter buffer 202 comprises a first circular buffer 204 (payload buffer) and a second circular buffer 206 (associated table). In one embodiment, buffer 204 is configured to store payloads of the incoming data packets based on receive sequence 208. Buffer 206 is configured to store real-time transport protocol (RTP) packet header information, such as (i) transmission sequence number, (ii) packet size, and/or (iii) markers and pointers, based on transmission sequence 210. In an alternative embodiment, buffer 204 may be configured to store the entire contents of packets based on receive sequence 208 and buffer 206 may only contain pointers to corresponding locations in buffer 204 based on transmission sequence 210 decoded from the RTP packet header.

As shown in FIG. 2, receive sequence 208 may be different from original transmission sequence 210. Therefore, specified memory locations in the associated table (buffer 206) for storing information of out-of-sequence packets are reserved regardless of the packet's position in the receive sequence (actual packet arrival). For example, as shown in FIG. 2, packets 2 and 3 arrive earlier than packet 1 and are stored in positions 204-1 and 204-2 of buffer 204, respectively. The out-of-sequence packet 1, which is received after packet 3, is stored in position 204-3 of buffer 204. However, the RTP packet header information or the corresponding pointer is stored in positions 206-1, 206-2, and 206-3 of the associated table (buffer 206) for packets 1, 2, and 3, respectively. Therefore, for packet 1, the payload is stored in position 204-3 of buffer 204 and the packet header information or pointer is stored in position 206-1 of buffer 206; for packet 2, the payload is stored in position 204-1 of buffer 204 and the packet header information or pointer is stored in position 206-2 of buffer 206; and for packet 3, the payload is stored in position 204-2 of buffer 204 and the packet header information or pointer is stored in position 206-3 of buffer 206.

In the following description, index i represents the i-th received packet and index j(i) represents the transmission sequence number for the i-th received packet. j(i) may be obtained from the RTP packet header. In general, index i might not be equal to index j(i) because of lost or out-of-sequence packets. i and j(i) are both integers.

Figure 3A:
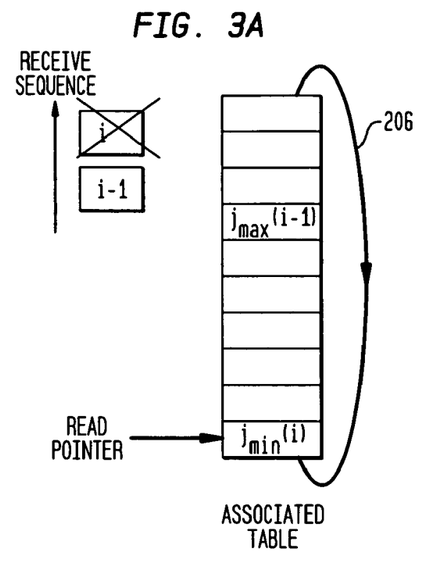
FIG. 3A illustrates operation of the jitter buffer of FIG. 2 when a new packet is discarded.

FIGS. 3A–3D illustrate operation of buffer 206 when jitter buffer 202 of FIG. 2 receives the i-th packet. Define P(i) as the highest transmission sequence number corresponding to the packets that have already been forwarded for playout from jitter buffer 202 to the decoder, such as decoder 104 of FIG. 1, and define $j_{min}(i)$ as the lowest transmission sequence number corresponding to the packets stored in jitter buffer 202 when the i-th packet was received. Typically, the position in the associated table corresponding to the transmission sequence number of $j=_{min}(i)=P(i)+1$ is marked by a read pointer for the next data forwarding action. As illustrated by FIG. 3A, if $j(i)<j_{min}(i)$, then the i-th packet arrived too late for forwarding and may be discarded. A decoder may employ missing-packet interpolation to smooth out the periods of transmission corresponding to lost or discarded packets. In one embodiment of the present invention, special handling instructions might be applied, for example, when $j(i)=j_{min}(i)-1$. In this case, the i-th packet is not discarded but is either stored or forwarded directly to the decoder just prior to the packet having the transmission sequence number of $j_{min}(i)$.

Figure 3B:
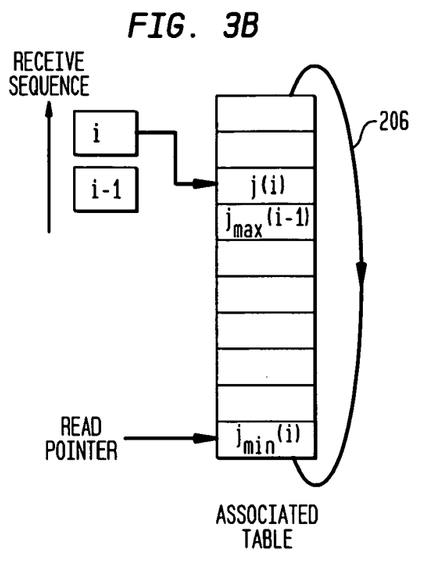
FIG. 3B illustrates operation of the jitter buffer of FIG. 2 when a new packet is an in-sequence packet.
Figure 3C:
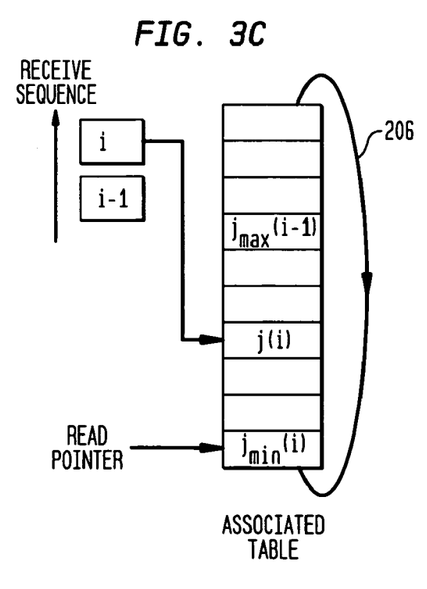
FIG. 3C illustrates operation of the jitter buffer of FIG. 2 when a new packet is an old out-of-sequence packet.
Figure 3D:
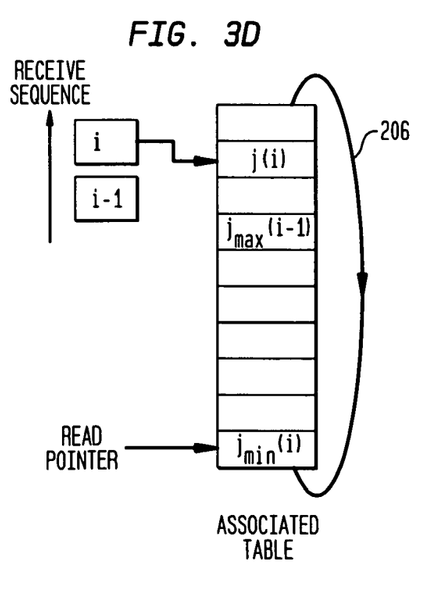
FIG. 3D illustrates operation of the jitter buffer of FIG. 2 when a new packet is a new out-of-sequence packet.

FIGS. 3B–3D illustrate positions of packets within buffer 206 for three situations when $j(i)>j_{min}(i)$ and the i-th packet is stored in jitter buffer 202 for future playout. In these figures, $j_{max}(i-1)$ denotes the largest transmission sequence number corresponding to the packets received by buffer 202 prior to the i-th packet.

FIG. 3B shows a first situation, in which $j(i)=j_{max}(i-1)+1$. In this situation, the i-th packet is an in-sequence packet and its packet header information is written into the cell of buffer 206 immediately following the cell that stores the packet header information of the packet having the transmission sequence number of $j_{max}(i-1)$.

FIG. 3C shows a second situation, in which $j(i)<j_{max}(i-1)$. In this situation, the i-th packet is an old out-of-sequence packet (i.e., a previously skipped packet). The packet header information of this packet is written into the corresponding cell of buffer 206 located between the cells corresponding to $j_{min}(i)$ and $j_{max}(i-1)$.

FIG. 3D shows a third situation, in which $j(i)>j_{max}(i-1)+1$. In this situation, the i-th packet is a new out-of-sequence packet (defined as a packet whose transmission sequence number is greater than $j_{max}(i-1)$ by at least two). The packet header information of this packet is written into the corresponding cell of buffer 206.

Figure 4:
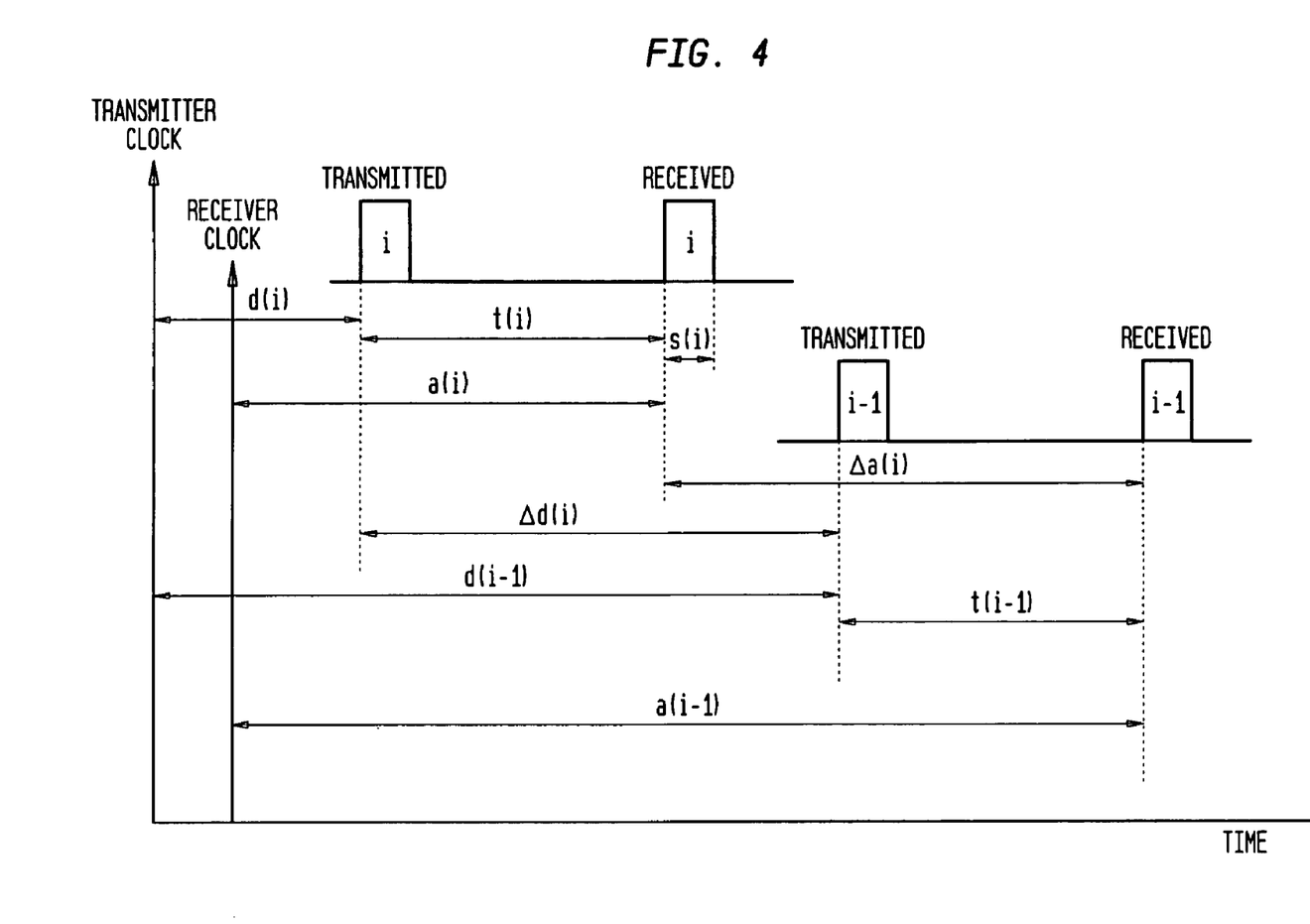
FIG. 4 illustrates various parameters describing timing of packets in the jitter buffer of FIG. 2.

FIG. 4 illustrates the relationship and definitions for various parameters used to describe the timing of the incoming data packets.

"Packet Arrival Time," a(i), of the i-th received packet is a value corresponding to the packet's arrival time at the destination provided by a local master clock, e.g., T1, E1, or TDM clock at the receiver.

"Inter-Arrival Time," Δa(i), of the i-th received packet is defined as the time difference between the packet arrival time of the i-th packet and that of the previous packet (i.e., the (i−1)-th packet), as given in Eqn. (1):

$$\Delta a(i)=a(i)-a(i-1). \quad (1)$$

Calculation of the inter-arrival time between two successive packets is based on the sequence of arrival, e.g., receive sequence 208 of FIG. 2. This does not always reflect the true physical inter-arrival time in terms of transmission sequence. For example, if packet 1 was sent at 0 msec and arrived at 100 msec, packet 2 was sent at 20 msec and arrived at 140 msec, and packet 3 was sent at 40 msec arrived at 120 msec, then the inter-arrival time, as defined above, will be 20 msec for each consecutive pair of packets. However, after examining the transmission sequence numbers, the true physical inter-arrival time would be 40 msec between packets 1 and 2 and −20 msec between packets 2 and 3.

"Packet Departure Time," d(i), is defined as the time at which the i-th received packet was transmitted to the network from a source. This information is generated by the DSP clock in the source and is embedded in the timestamp field of the RTP packet header.

"Expected Inter-Arrival Time," Δd(i), is the difference in departure times between the i-th packet and the previously received packet, as given in Eqn. (2):

$$\Delta d(i)=d(i)-d(i-1). \quad (2)$$

In the above example illustrating Eqn. (1), the expected inter-arrival time, as defined above, will be 40 msec and −20 msec for the first and second consecutive pairs of received packets, respectively.

"Packet Transmission Time," t(i), is defined as the amount of time from when the i-th packet is transmitted to the network by the source to when it is received by the receiver, as given in Eqn. (3):

$$t(i)=a(i)-d(i). \quad (3)$$

Since the transmitter and the receiver are not necessarily synchronized, t(i) might not be equal to the actual delay experienced by the i-th packet during the transit on the network.

"Length," s(i), is the length (in bits or in time) of the i-th packet.

Several additional parameters associated with operation of jitter buffer 202 and not illustrated in FIG. 4 are defined as follows:

"Delay-Expected Inter-Arrival Time," Δt(i), is derived as given in Eqn. (4) using the packet transmission time for the i-th packet and that of the previous packet:

$$\Delta t(i)=t(i)-t(i-1)=[a(i)-d(i)]-[a(i-1)-d(i-1)]=\Delta d(i) \quad (4)$$

"Packet Waiting Time," b'(i), in the jitter buffer is defined as the amount of time between when the i-th packet arrived at the jitter buffer and when it was forwarded to the decoder for playout.

"Variation Measure," v(i), is a quantity representing variation of the packet waiting time in the jitter buffer. One particular definition of v(i) is given in the foregoing using Eqns. (6) or (9). Other definitions of v(i) may be employed as well without departing from the principles set forth in this specification.

"Out-of-Sequence Error," e(i), corresponds to the playout delay due to the presence of out-of-sequence packets.

"Packet-Based Threshold," T(i), of the jitter buffer is a value corresponding to the amount of time between when the i-th packet arrived at the jitter buffer and to when the jitter buffer is ready to forward to the decoder an accumulated sequence of packets starting from the i-th packet.

Figure 5:
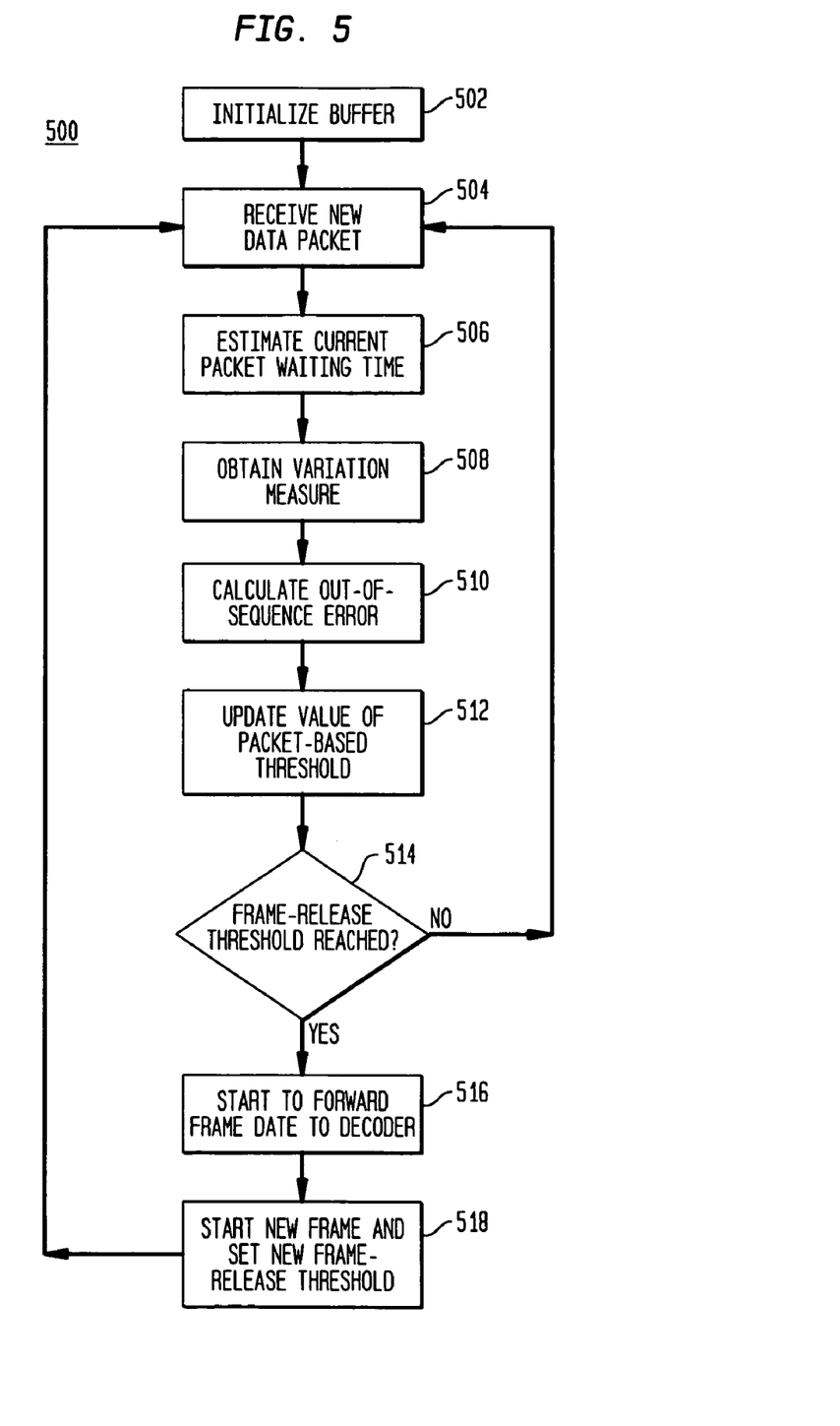
FIG. 5 is a flowchart illustrating an exemplary method of operation of the jitter buffer of FIG. 2.

FIG. 5 shows a method 500 of adaptive jitter buffer management for playout of packetized data received over a network that may be employed for operation of jitter buffer 202 of FIG. 2, according to one embodiment of the present invention. Packets of data are temporarily stored in jitter buffer 202 for eventual transmission to a decoder, such as decoder 104 of FIG. 1. According to method 500, data packets stored in jitter buffer 202 are logically organized into frames, where each frame comprises one or more consecutively received data packets. Data packets in a particular frame are sequentially transmitted (preferably based on their transmission sequence as described in the context of FIGS. 2–3) to the decoder when the waiting time of the oldest data packet in the frame exceeds a specified frame-release threshold value, where the waiting time of a data packet may be defined as the difference between the current time and the time that the data packet arrived at the receiver. According to method 500, a new frame of data packets is started when the previous frame begins to be transmitted to the decoder.

In preferred implementations of the present invention, the frame-release threshold value used to determine when to send data packets to the decoder is a dynamic value that is updated every time a new frame is started, based on the current value of a packet-based threshold value that is itself updated every time a new data packet arrives at the receiver. The packet-based threshold value is updated based on a number of different characteristics of the flow of data packets from the transmitter to the decoder in the receiver. In a preferred implementation, the packet-based threshold value is updated based on current measures or estimates of the packet waiting time b'(i), the variation v(i), and the out-of-sequence error e(i) described previously. According to method 500, when a new frame is started, the frame-release threshold value for that new frame is set equal to the current value of the packet-based threshold. The new frame will eventually be released when the waiting time of the oldest packet in that frame exceeds that frame-release threshold value. In the meantime, the packet-based threshold value will continue to be updated dynamically as each new data packet of the current frame is stored in the jitter buffer, for eventual use in setting the frame-release threshold value for the next frame.

Referring again to FIG. 5, in step 502 of method 500, jitter buffer 202 is initialized. Initialization refers to the resetting to initial values of all of the parameters used to determine the frame-release threshold value and the packet-based threshold value. During initialization, the frame-release threshold value Th(k=1) for the first frame is set to a predetermined value $T_{init}$ having a typical value of 80 ms. Initialization of other parameters is described below in the context of subsequent steps of method 500. Three representative examples of when the jitter buffer may be initialized are: (i) a new talk spurt arrives (defined as a sequence of data packets following a sufficiently long period of receiving no data packets); (ii) a silence period occurs (defined as a sufficiently long period of receiving no data packets); or (iii) the jitter buffer is emptied during playout. In describing the operation of jitter buffer 202, a process period from one initialization to the next initialization of the jitter buffer is referred to as a window. Data packets in a window are further divided into frames. A frame is a set of data packets that are consecutively received at the jitter buffer and organized in the jitter buffer according to their transmission sequence numbers. In general, the description herein is given for a single window. However, it will be apparent to a person skilled in the art that the described method can be extended to multiple windows.

In step 504, a new data packet is stored in jitter buffer 202, e.g., as described in the context of FIGS. 3A–3D. In step 506, the current packet waiting time b'(i) is estimated using the RTP packet header information and packet arrival time at the receiver. In step 508, the variation measure v(i) is calculated using the current packet waiting time value of step 506.

In one embodiment of the present invention, an estimate, b(i), for the current packet waiting time b'(i) in a frame of jitter buffer 202 and its variation measure v(i) are obtained during steps 506 and 508 of method 500 using recursive Equations (5) and (6):

$$b(i)=\alpha b(i-1)+(1-\alpha)\Delta t(i) \quad (5)$$

$$v(i)=\alpha v(i-1)+(1-\alpha)|b(i)-\Delta t(i)| \quad (6)$$

If the frame for which these values are calculated is a first frame of a window, the following initial conditions may be applied: $b(0)=T_{init}$; $v(0)=0$; and $t(0)=0$, where $\alpha$ is a first weighting coefficient. In a preferred implementation of steps 506 and 508, the value for a is selected as 0.998002. Values for b(i) and v(i) are calculated each time a new packet arrives.

In a different implementation of steps 506 and 508, an estimate, b(i), for the current packet waiting time b'(i) in a frame of jitter buffer 202 and its variation measure v(i) may be calculated via recursive Equations (7), (8), and (9):

$$b(i)=\alpha b(i-1)+(1-\alpha)\Delta t(i), \text{ if } \Delta t(i) \leq b(i-1), \quad (7)$$

$$b(i)=\beta b(i-1)+(1-\beta)\Delta t(i), \text{ if } \Delta t(i) > b(i-1), \quad (8)$$

$$v(i)=\alpha v(i-1)+(1-\alpha)|b(i)-\Delta t(i)| \quad (9)$$

where $\beta$ is a second weighting coefficient. Preferably, $\alpha=0.998002$ and $\beta=0.75$. Using the smaller weighing coefficient ($\beta$) for the increasing jitter trend ($\Delta t(i)>b(i-1)$) allows the jitter buffer to quickly adjust its operation to sudden irregularities in the network traffic, while returning more gradually to a setting corresponding to regular network performance.

In step 510, the out-of-sequence error e(i) is calculated using the RTP packet header information of out-of-sequence packets arriving at the receiver. In one embodiment, the out-of-sequence error e(i) is calculated using recursive Equations (10) and (11):

$$e(i)=c(i) \text{ if } j(i) \geq j_{max}(i-1)+1, \quad (10)$$

$$e(i)=c(i)+(d(i)-d^*(i-1)) \text{ if } j(i)<j_{max}(i-1), \quad (11)$$

where $d^*(i-1)$ is the packet departure time for the packet having the transmission sequence number of $j_{max}(i-1)$ and c(i) is a variable corresponding to the gap in the transmission sequence numbers for the packets currently stored in jitter buffer 202 due to the presence of out-of-sequence packets. The value of c(i) is calculated using recursive Equations (12), (13), and (14):

$$c(i)=c(i-1) \text{ if } j(i)=j_{max}(i-1)+1 \quad (12)$$

$$c(i)=c(i-1)+(d(i)-d^*(i-1)) \text{ if } i(i)>j_{max}(i-1)+1, \quad (13)$$

$$c(i)=c(i-1)-s(i) \text{ if } j(i) \leq j_{max}(i-1). \quad (14)$$

In a preferred implementation of step 510, the initial value for c(i) is chosen to be a small predetermined constant, e.g., 1 msec.

In step 512, the packet-based threshold value T(i) is calculated using the current packet waiting time, variation measure, and out-of-sequence error calculated in steps 506–510. In one embodiment, the packet-based threshold T(i) is calculated using Equations (15)–(17) as follows:

$$T(i)=T_{min} \text{ if } b(i)+\mu v(i)+e(i) \leq T_{min} \quad (15)$$

$$T(i)=b(i)+\mu v(i)+e(i) \text{ if } T_{min}<b(i)+\mu v(i)+e(i)<T_{max} \quad (16)$$

$$T(i)=T_{max} \text{ if } b(i)+\mu v(i)+e(i) \geq T_{max} \quad (17)$$

where $\mu$ is a third weighing coefficient and $T_{min}$ and $T_{max}$ are preset minimum and maximum buffer release threshold values. The minimum and maximum buffer release threshold values are set and predetermined by, for example, simulation or traffic observation. In a preferred implementation of step 512, $\mu=4$.

In step 514, the waiting time of the oldest packet in a current frame is compared with the frame-release threshold. If the waiting time of the oldest packet in the current frame is less than the frame-release threshold, processing returns to step 504 to receive another data packet. If the waiting time of the oldest packet in the current frame reaches or exceeds the frame-release threshold, processing proceeds to step 516.

In step 516, data packets of the current frame (i.e., frame k) begin to be transmitted sequentially to the decoder starting with the oldest packet in the frame. Processing then continues immediately to step 518. While the processing of FIG. 5 continues, the steady transmission of packets will proceed independently until all of the data packets of frame k have been sent to the decoder. It is possible (and indeed preferable for continuous playout at the decoder) that step 516 will occur for frame k before all of the data packets of frame (k−1) have been sent to the decoder. In this case, the transmission of packets of frame k will start after all of the data packets of frame (k−1) have been sent.

In step 518, a new frame of data (frame (k+1)) (which becomes the current frame for the next iteration cycle) is started and its frame-release threshold Th(k+1) is set. In one embodiment of the present invention, the frame-release threshold Th(k+1) is set to be equal to the value of the packet-based threshold T(i) calculated according to Equations (15)–(17) in the immediately preceding step 512 (i.e., at the end of the (k)-th frame). After step 518, the buffer returns to step 504 to receive the first data packet for the new frame.

The packet-based threshold T(i) as calculated according to Eqns. (15)–(17) is based on three components:

(1) a first component, b(i), related to the integral of the variation in the packet transit time over the network from when a packet was sent by the source to when the packet arrived at the destination and was enqueued into the jitter buffer;

(2) a second component, $\mu v(i)$, corresponding to the jitter (i.e., variation) in the packet transit time from the source to the destination and reflecting the stability of network performance; and (3) a third component, e(i), corresponding to the additional waiting time necessary to fill the gaps in the associated table due to the presence of out-of-sequence packets.

Figure 6:
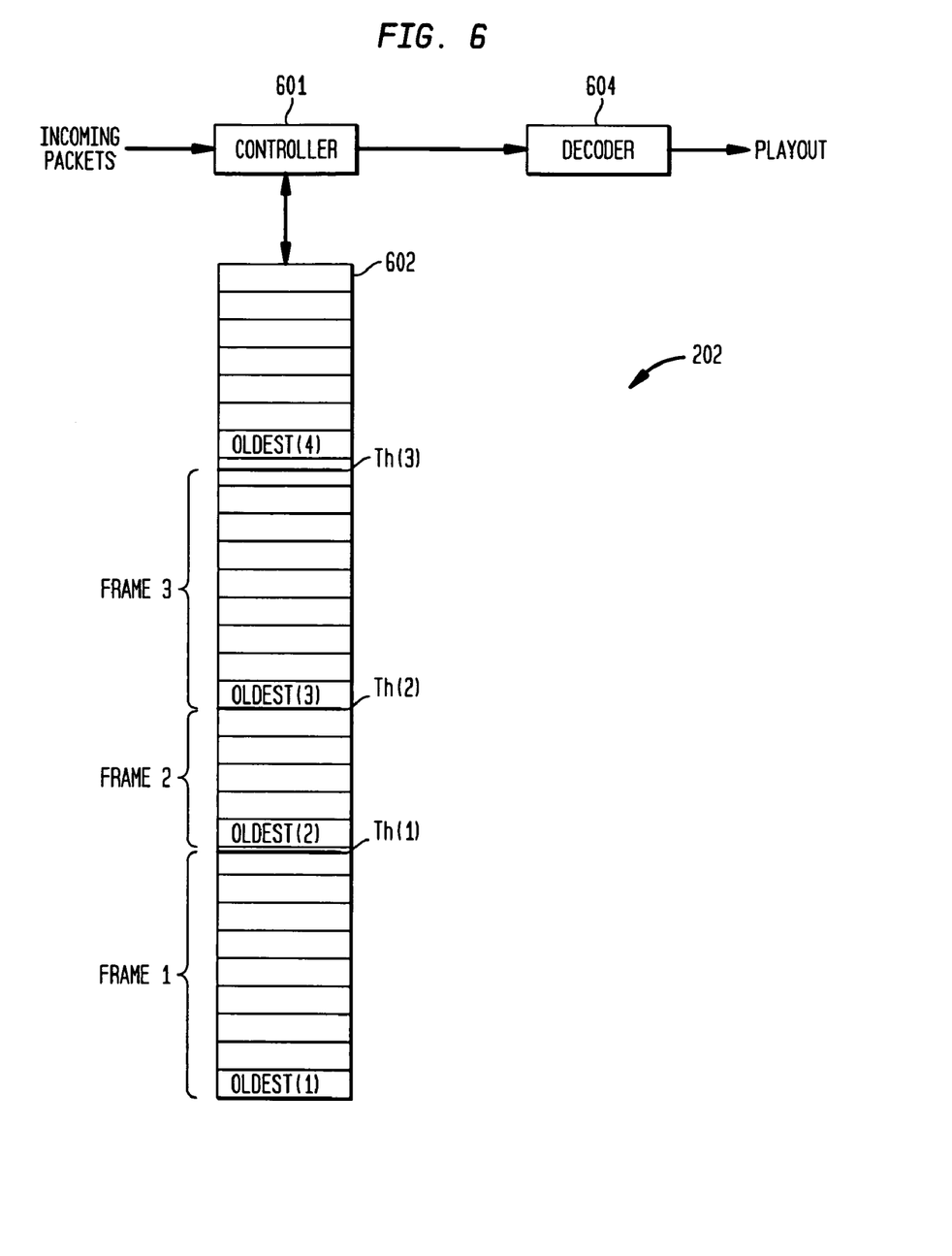
FIG. 6 illustrates operation of the jitter buffer of FIG. 2 according to the exemplary method of FIG. 5.

FIG. 6 illustrates operation of jitter buffer 202 according to one embodiment of the present invention. Jitter buffer 202 comprises a controller 601 and a memory 602. Suppose that Frame 1 is the first frame after jitter buffer 202 is initialized. In one embodiment of the present invention, controller 601 sets the frame-release threshold for Frame 1 (Th(1)) to be $T_{init}$. Each time a new packet arrives at the buffer, controller 601 calculates the packet-based threshold T(i) according to method 500 of FIG. 5. Its value is allowed to fluctuate between a low limit ($T_{min}$) and a high limit ($T_{max}$) as the buffer receives incoming data packets. When the waiting time of the oldest packet in Frame 1 (marked "oldest(1)" in FIG. 6) reaches or exceeds Th(1), controller 601 instructs memory 602 to start Frame 2 and sets its frame-release threshold Th(2) to be the value of T(i) calculated at the end of Frame 1. Controller 601 also sets a flag indicating that jitter buffer 202 is ready for service by decoder 604. Decoder 604 addresses jitter buffer 202 to decode and play out the data packets of Frame 1 preferably at a constant rate when it detects that the flag is set.

Jitter buffer 202 accumulates data packets in Frame 2 until the waiting time of the oldest packet in Frame 2 (marked "oldest(2)" in FIG. 6) reaches or exceeds Th(2). If by that time all data packets of Frame 1 have been forwarded to decoder 604, controller 601 sets a flag indicating that jitter buffer 202 is again ready for service by decoder 604. If data packets of Frame 1 are still being forwarded to decoder 604 at the time Th(2) is reached, controller 601 queues the data packets of Frame 2 to be forwarded to decoder 604 immediately after the data packets of Frame 1. Jitter buffer 202 may also start Frame 3 and set its frame-release threshold Th(3) to be the value of T(i) calculated at the end of Frame 2. The described procedure may be repeated for new frames until jitter buffer 202 has to be re-initialized. Jitter buffer 202 may be employed in a stack of jitter buffers having adjustable release thresholds, wherein decoder 604 services each buffer in the stack when its flag is set.

A jitter buffer operating in accordance with one or more embodiments of the present invention allows for handling of network jitter and/or irregularities, such as late arrival of packets and/or out-of-sequence packets, while maintaining relatively low playout delay and relatively high quality of service. Iteratively adjusting the release threshold in a jitter buffer to changing network traffic characteristics may allow for enhanced buffer service, especially in networks with packetized voice data. Embodiments of the present invention may be implemented using an application specific integrated circuit (ASIC) and/or DSP software and can be applied, e.g., to voice over Internet Protocol (VoIP) service.

While embodiments of the present invention are described with various equations, one skilled in the art would realize that these equations may be scaled, offset, and/or adjusted with additional quantities depending on the specific implementation.

While this invention has been described with reference to illustrative embodiments, this description is not intended to be construed in a limiting sense. In particular, the present invention may be implemented for jitter buffers having a structure different from that illustratively used to describe the invention and shown in FIGS. 2, 3A, 3B, 3C, and 3D without departing from the principles set forth in this specification, including buffer 102 of FIG. 1. Various modifications of the described embodiments, as well as other embodiments of the invention, which are apparent to persons skilled in the art to which the invention pertains are deemed to lie within the principle and scope of the invention as expressed in the following claims. Although the present invention has been described with reference to packetized voice data, it can also be used with other types of packetized real-time data, e.g., video, without departing from the principles set forth in this specification.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for processing data packets received from a network, the method comprising the steps of:
   (A) storing each received data packet in a buffer;
   (B) dynamically updating a first threshold value based on
       (i) variation in packet transit time over the network and
       (ii) data packets arriving out-of-sequence;
   (C) performing a comparison based on a waiting time of a data packet and the first threshold value; and
   (D) transmitting the data packet from the buffer for further processing based on the comparison of step (C), wherein:
   the data packets are organized in the buffer into one or more frames, each frame comprising one or more data packets;
   the first threshold value is updated every time a new data packet is stored in the buffer;
   each frame is assigned a frame-release threshold based on the first threshold value;
   step (C) comprises the step of comparing the waiting time of an oldest data packet in a current frame to the frame-release threshold; and
   step (D) comprises the step of sequentially transmitting all of the data packets in the current frame from the buffer for the further processing based on the comparison of step (C).

2. The invention of claim 1, wherein step (D) further comprises the steps of starting a new frame and assigning the frame-release threshold for the new frame based on a current value of the first threshold value.

3. The invention of claim 1, wherein, for each data packet, step (B) comprises the steps of:
   (B1) generating an estimated current packet waiting time;
   (B2) generating a variation measure;
   (B3) generating an out-of-sequence error; and
   (B4) updating the first threshold value based on the estimated current packet waiting time, the variation measure, and the out-of-sequence error.

4. The invention of claim 3, wherein, for step (B):
   the estimated current packet waiting time corresponds to an integral of variation in packet transit time over the network;
   the variation measure corresponds to jitter in the packet transit time; and
   the out-of-sequence error corresponds to additional waiting time due to the presence of the out-of-sequence packets.

5. The invention of claim 4, wherein, for step (B4), the first threshold value is limited to be no less than a specified lower limit and no greater than a specified upper limit.

6. The invention of claim 3, wherein, for step (B), the first threshold value T(i) is set to:

$T_{min}$, if $b(i)+\mu v(i)+e(i) \leq T_{min}$;

$b(i)+\mu v(i)+e(i)$, if $T_{min} < b(i)+\mu v(i)+e(i) < T_{max}$; or $T_{max}$, if $b(i)+\mu v(i)+e(i) \geq T_{max}$, wherein:

b(i) is the estimated current packet waiting time;
v(i) is the variation measure;
e(i) is the out-of-sequence error;
μ is a first weighting coefficient;
$T_{min}$ is a lower limit; and
$T_{max}$ is an upper limit.

7. The invention of claim 6, wherein for step (B) the out-of-sequence error e(i) is set to:

$e(i)=c(i)$, if $j(i) \geq j_{max}(i-1)+1$, or $e(i)=c(i)+(d(i)-d^*(i-1))$, if $j(i) \leq j_{max}(i-1)$, wherein:

c(i) is a recursive value;
j(i) is the transmission sequence number corresponding to an i-th packet;
$j_{max}(i-1)$ is the largest transmission sequence number corresponding to the data packets in the jitter buffer prior to arrival of the i-th packet;
d(i) is packet departure time for the i-th packet; and
$d^*(i-1)$ is packet departure time for the packet whose transmission sequence number is $j_{max}(i-1)$.

8. The invention of claim 7, wherein for step (B) the recursive value c(i) is set to:

$c(i)=c(i-1)$, if $j(i)=j_{max}(i-1)+1$, $c(i)=c(i-1)+(d(i)-d^*(i-1))$, if $j(i)>j_{max}(i-1)+1$, or $c(i)=c(i-1)-s(i)$, if $j(i) \geq j_{max}(i-1)$, wherein:

c(i−1) is a current value of the recursive value;
s(i) is the length of the i-th packet.

9. The invention of claim 6, wherein for step (B) the estimated current packet waiting time b(i) and the variation measure v(i) are set to:

$b(i)=\alpha b(i-1)+(1-\alpha)\Delta t(i)$; and $v(i)=\alpha v(i-1)+(1-\alpha)|b(i)-\Delta t(i)|$, wherein:

b(i−1) is a current value of the estimated current packet waiting time;
v(i−1) is a current value of the variation measure;
Δt(i) is delay-expected inter-arrival time corresponding to an i-th packet; and
α is a second weighting coefficient.

10. The invention of claim 6, wherein for step (B) the estimated current packet waiting time b(i) is set to:

$b(i)=\alpha b(i-1)+(1-\alpha)\Delta t(i)$, if $\Delta t(i) \leq b(i-1)$, or $b(i)=\beta b(i-1)+(1-\beta)\Delta t(i)$, if $\Delta t(i)>b(i-1)$; and the variation measure v(i) is set to:

$v(i)=\alpha v(i-1)+(1-\alpha)|b(i)-\Delta t(i)|$, wherein:

b(i−1) is a current value of the estimated current packet waiting time;
v(i−1) is a current value of the variation measure;
Δt(i) is delay-expected inter-arrival time corresponding to an i-th packet;
α is a second weighting coefficient; and
β is a third weighting coefficient.

11. The invention of claim 1, wherein for step (A) the data packets comprise audio data packets.

12. The invention of claim 11, wherein the audio data packets comprise voice over Internet Protocol (VoIP) data packets.

13. The invention of claim 1, wherein the method is implemented in a processor of an integrated circuit.

14. A buffer for processing data packets transmitted over a network, comprising:
a memory configured to store each received data packet; and
a controller configured to (A) dynamically update a first threshold value based on (i) variation in packet transit time over the network and (ii) data packets arriving out-of-sequence; (B) perform a comparison based on a waiting time of a data packet and the first threshold value; and (C) transmit the data packet from the buffer for further processing based on the comparison, wherein:
the data packets are organized in the buffer into one or more frames, each frame comprising one or more data packets;
the first threshold value is updated every time a new data packet is stored in the buffer;
each frame is assigned a frame-release threshold based on the first threshold value; and
the buffer is further configured to compare the waiting time of an oldest data packet in a current frame to the frame-release threshold and sequentially transmit all of the data packets in the current frame from the buffer for the further processing based on the comparison.

15. The invention of claim 14, wherein the buffer is further configured to start a new frame and assign the frame-release threshold for the new frame based on a current value of the first threshold value.

16. The invention of claim 14, wherein, for each data packet, the buffer is configured to generate an estimated current packet waiting time, a variation measure, and an out-of-sequence error; and to update the first threshold value based on the estimated current packet waiting time, the variation measure, and the out-of-sequence error.

17. The invention of claim 16, wherein:
the estimated current packet waiting time corresponds to an integral of variation in packet transit time over the network;
the variation measure corresponds to jitter in the packet transit time; and
the out-of-sequence error corresponds to additional waiting time due to the presence of the out-of-sequence packets.

18. The invention of claim 17, wherein the first threshold value is limited to be no less than a specified lower limit and no greater than a specified upper limit.

19. The invention of claim 16, wherein the buffer is further configured to set the first threshold value T(i) to:

$T_{min}$, if $b(i)+\mu v(i)+e(i) \leq T_{min}$;

$b(i)+\mu v(i)+e(i)$, if $T_{min}<b(i)+\mu v(i)+e(i)<T_{max}$; or $T_{max}$, if $b(i)+\mu v(i)+e(i) \geq T_{max}$, wherein:

b(i) is the estimated current packet waiting time;
v(i) is the variation measure;
e(i) is the out-of-sequence error;
μ is a first weighting coefficient;
$T_{min}$ is a lower limit; and
$T_{max}$ is an upper limit.

20. The invention of claim 19, wherein the buffer is further configured to set the out-of-sequence error e(i) to:

$e(i)=c(i)$, if $j(i) \geq j_{max}(i-1)+1$, or $e(i)=c(i)+(d(i)-d^*(i-1))$, if $j(i) \leq j_{max}(i-1)$, wherein:

c(i) is a recursive value;
j(i) is the transmission sequence number corresponding to an i-th packet;
$j_{max}(i-1)$ is the largest transmission sequence number corresponding to the data packets in the jitter buffer prior to arrival of the i-th packet;
d(i) is packet departure time for the i-th packet; and
d*(i−1) is packet departure time for the packet whose transmission sequence number is $j_{max}(i-1)$.

21. The invention of claim 20, wherein the buffer is further configured to set the recursive value c(i) to:

$c(i)=c(i-1)$, if $j(i)=j_{max}(i-1)+1$, $c(i)=c(i-1)+(d(i)-d^*(i-1))$, if $j(i)>j_{max}(i-1)+1$, or $c(i)=c(i-1)-s(i)$, if $j(i) \leq j_{max}(i-1)$, wherein:

c(i−1) is a current value of the recursive value;
s(i) is the length of the i-th packet.

22. The invention of claim 19, wherein the buffer is further configured to set the estimated current packet waiting time b(i) and the variation measure v(i) to:

$$b(i)=\alpha b(i-1)+(1-\alpha)\Delta t(i); \text{ and}$$

$$v(i)=\alpha v(i-1)+(1-\alpha)|b(i)-\Delta t(i)|, \text{ wherein:}$$

b(i−1) is a current value of the estimated current packet waiting time;
v(i−1) is a current value of the variation measure;
Δt(i) is delay-expected inter-arrival time corresponding to an i-th packet; and
α is a second weighting coefficient.

23. The invention of claim 19, wherein the buffer is further configured to set the estimated current packet waiting time b(i) to:

$$b(i)=\alpha b(i-1)+(1-\alpha)\Delta t(i), \text{ if } \Delta t(i)\leq b(i-1), \text{ or}$$

$$b(i)=\beta b(i-1)+(1-\beta)\Delta t(i), \text{ if } \Delta t(i)>b(i-1); \text{ and}$$

the variation measure v(i) is set to:

$$v(i)=\alpha v(i-1)+(1-\alpha)|b(i)-\Delta t(i)|, \text{ wherein:}$$

b(i−1) is a current value of the estimated current packet waiting time;
v(i−1) is a current value of the variation measure;
Δt(i) is delay-expected inter-arrival time corresponding to an i-th packet;
α is a second weighting coefficient; and
β is a third weighting coefficient.

24. The invention of claim 14, wherein the buffer is implemented in an integrated circuit.

25. A method for processing data packets received from a network, the method comprising the steps of:
(A) storing each received data packet in a buffer;
(B) dynamically updating a first threshold value based on
    (i) variation in packet transit time over the network and
    (ii) data packets arriving out-of-sequence;
(C) performing a comparison based on a waiting time of a data packet and the first threshold value; and
(D) transmitting the data packet from the buffer for further processing based on the comparison of step (C), wherein, for each data packet, step (B) comprises the steps of:
    (B1) generating an estimated current packet waiting time;
    (B2) generating a variation measure;
    (B3) generating an out-of-sequence error; and
    (B4) updating the first threshold value based on the estimated current packet waiting time, the variation measure, and the out-of-sequence error, wherein, for step (B):
        the estimated current packet waiting time corresponds to an integral of variation in packet transit time over the network;
        the variation measure corresponds to jitter in the packet transit time; and
        the out-of-sequence error corresponds to additional waiting time due to the presence of the out-of-sequence packets.

26. The invention of claim 25, wherein, for step (B4), the first threshold value is limited to be no less than a specified lower limit and no greater than a specified upper limit.

27. A method for processing data packets received from a network, the method comprising the steps of:
(A) storing each received data packet in a buffer;
(B) dynamically updating a first threshold value based on
    (i) variation in packet transit time over the network and
    (ii) data packets arriving out-of-sequence;
(C) performing a comparison based on a waiting time of a data packet and the first threshold value; and
(D) transmitting the data packet from the buffer for further processing based on the comparison of step (C), wherein, for each data packet, step (B) comprises the steps of:
    (B1) generating an estimated current packet waiting time;
    (B2) generating a variation measure;
    (B3) generating an out-of-sequence error; and
    (B4) updating the first threshold value based on the estimated current packet waiting time, the variation measure, and the out-of-sequence error, wherein, for step (B), the first threshold value T(i) is set to:

$$T_{min}, \text{ if } b(i)+\mu v(i)+e(i)\leq T_{min};$$

$$b(i)+\mu v(i)+e(i), \text{ if } T_{min}<b(i)+\mu v(i)+e(i)<T_{max}; \text{ or}$$

$$T_{max}, \text{ if } b(i)+\mu v(i)+e(i)\geq T_{max}, \text{ wherein:}$$

b(i) is the estimated current packet waiting time;
v(i) is the variation measure;
e(i) is the out-of-sequence error;
μ is a first weighting coefficient;
$T_{min}$ is a lower limit; and
$T_{max}$ is an upper limit.

28. The invention of claim 27, wherein for step (B) the out-of-sequence error e(i) is set to:

$$e(i)=c(i), \text{ if } j(i)\geq j_{max}(i-1)+1, \text{ or}$$

$$e(i)=c(i)+(d(i)-d^*(i-1)), \text{ if } j(i)\leq j_{max}(i-1), \text{ wherein:}$$

c(i) is a recursive value;
j(i) is the transmission sequence number corresponding to an i-th packet;
$j_{max}(i-1)$ is the largest transmission sequence number corresponding to the data packets in the jitter buffer prior to arrival of the i-th packet;
d(i) is packet departure time for the i-th packet; and
d*(i−1) is packet departure time for the packet whose transmission sequence number is $j_{max}(i-1)$.

29. The invention of claim 28, wherein for step (B) the recursive value c(i) is set to:

$$c(i)=c(i-1), \text{ if } j(i)=j_{max}(i-1)+1,$$

$$c(i)=c(i-1)+(d(i)-d^*(i-1)), \text{ if } j(i)>j_{max}(i-1)+1, \text{ or}$$

$$c(i)=c(i-1)-s(i), \text{ if } j(i)\leq j_{max}(i-1), \text{ wherein:}$$

c(i−1) is a current value of the recursive value;
s(i) is the length of the i-th packet.

30. The invention of claim 27, wherein for step (B) the estimated current packet waiting time b(i) and the variation measure v(i) are set to:

$$b(i)=\alpha b(i-1)+(1-\alpha)\Delta t(i); \text{ and}$$

$$v(i)=\alpha v(i-1)+(1-\alpha)|b(i)-\Delta t(i)|, \text{ wherein:}$$

b(i−1) is a current value of the estimated current packet waiting time;

v(i−1) is a current value of the variation measure;

Δt(i) is delay-expected inter-arrival time corresponding to an i-th packet; and

α is a second weighting coefficient.

31. The invention of claim 27, wherein for step (B) the estimated current packet waiting time b(i) is set to:

$$b(i)=\alpha b(i-1)+(1-\alpha)\Delta t(i), \text{ if } \Delta t(i) \leq b(i-1), \text{ or}$$

$$b(i)=\beta b(i-1)+(1-\beta)\Delta t(i), \text{ if } \Delta t(i) > b(i-1); \text{ and}$$

the variation measure v(i) is set to:

$$v(i)=\alpha v(i-1)+(1-\alpha)|b(i)-\Delta t(i)|, \text{ wherein:}$$

b(i−1) is a current value of the estimated current packet waiting time;

v(i−1) is a current value of the variation measure;

Δt(i) is delay-expected inter-arrival time corresponding to an i-th packet;

α is a second weighting coefficient; and

β is a third weighting coefficient.

32. A buffer for processing data packets transmitted over a network, comprising:

a memory configured to store each received data packet; and a controller configured to (A) dynamically update a first threshold value based on (i) variation in packet transit time over the network and (ii) data packets arriving out-of-sequence; (B) perform a comparison based on a waiting time of a data packet and the first threshold value; and (C) transmit the data packet from the buffer for further processing based on the comparison, wherein, for each data packet, the buffer is configured to generate an estimated current packet waiting time, a variation measure, and an out-of-sequence error; and to update the first threshold value based on the estimated current packet waiting time, the variation measure, and the out-of-sequence error, wherein:

the estimated current packet waiting time corresponds to an integral of variation in packet transit time over the network;

the variation measure corresponds to jitter in the packet transit time; and the out-of-sequence error corresponds to additional waiting time due to the presence of the out-of-sequence packets.

33. The invention of claim 32, wherein the first threshold value is limited to be no less than a specified lower limit and no greater than a specified upper limit.

34. A buffer for processing data packets transmitted over a network, comprising:

a memory configured to store each received data packet; and a controller configured to (A) dynamically update a first threshold value based on (i) variation in packet transit time over the network and (ii) data packets arriving out-of-sequence; (B) perform a comparison based on a waiting time of a data packet and the first threshold value; and (C) transmit the data packet from the buffer for further processing based on the comparison, wherein, for each data packet, the buffer is configured to generate an estimated current packet waiting time, a variation measure, and an out-of-sequence error; and to update the first threshold value based on the estimated current packet waiting time, the variation measure, and the out-of-sequence error, wherein the buffer is further configured to set the first threshold value T(i) to:

$$T_{min}, \text{ if } b(i)+\mu v(i)+e(i) \leq T_{min};$$

$$b(i)+\mu v(i)+e(i), \text{ if } T_{min} < b(i)+\mu v(i)+e(i) < T_{max}; \text{ or}$$

$$T_{max}, \text{ if } b(i)+\mu v(i)+e(i) \geq T_{max}, \text{ wherein:}$$

b(i) is the estimated current packet waiting time;

v(i) is the variation measure;

e(i) is the out-of-sequence error;

μ is a first weighting coefficient;

$T_{min}$ is a lower limit; and $T_{max}$ is an upper limit.

35. The invention of claim 34, wherein the buffer is further configured to set the out-of-sequence error e(i) to:

$$e(i)=c(i), \text{ if } j(i) \geq j_{max}(i-1)+1, \text{ or}$$

$$e(i)=c(i)+(d(i)-d^*(i-1)), \text{ if } j(i) \leq j_{max}(i-1), \text{ wherein:}$$

c(i) is a recursive value;

j(i) is the transmission sequence number corresponding to an i-th packet;

$j_{max}(i-1)$ is the largest transmission sequence number corresponding to the data packets in the jitter buffer prior to arrival of the i-th packet;

d(i) is packet departure time for the i-th packet; and d*(i−1) is packet departure time for the packet whose transmission sequence number is $j_{max}(i-1)$.

36. The invention of claim 35, wherein the buffer is further configured to set the recursive value c(i) to:

$$c(i)=c(i-1), \text{ if } j(i)=j_{max}(i-1)+1,$$

$$c(i)=c(i-1)+(d(i)-d^*(i-1)), \text{ if } j(i)>j_{max}(i-1)+1, \text{ or}$$

$$c(i)=c(i-1)-s(i), \text{ if } j(i) \leq j_{max}(i-1), \text{ wherein:}$$

c(i−1) is a current value of the recursive value;

s(i) is the length of the i-th packet.

37. The invention of claim 34, wherein the buffer is further configured to set the estimated current packet waiting time b(i) and the variation measure v(i) to:

$$b(i)=\alpha b(i-1)+(1-\alpha)\Delta t(i); \text{ and}$$

$$v(i)=\alpha v(i-1)+(1-\alpha)|b(i)-\Delta t(i)|, \text{ wherein:}$$

b(i−1) is a current value of the estimated current packet waiting time;

v(i−1) is a current value of the variation measure;

Δt(i) is delay-expected inter-arrival time corresponding to an i-th packet; and

α is a second weighting coefficient.

38. The invention of claim 34, wherein the buffer is further configured to set the estimated current packet waiting time b(i) to:

$$b(i)=\alpha b(i-1)+(1-\alpha)\Delta t(i), \text{ if } \Delta t(i) \leq b(i-1), \text{ or}$$

$$b(i)=\beta b(i-1)+(1-\beta)\Delta t(i), \text{ if } \Delta t(i) > b(i-1); \text{ and}$$

the variation measure v(i) is set to:

$$v(i)=\alpha v(i-1)+(1-\alpha)|b(i)-\Delta t(i)|, \text{ wherein:}$$

b(i−1) is a current value of the estimated current packet waiting time;

v(i−1) is a current value of the variation measure;

Δt(i) is delay-expected inter-arrival time corresponding to an i-th packet;

α is a second weighting coefficient; and

β is a third weighting coefficient.

* * * * *

UNITED STATES PATENT AND TRADEMARK OFFICE
CERTIFICATE OF CORRECTION

| | | |
|---|---|---|
| PATENT NO. | : 7,079,486 B2 | Page 1 of 1 |
| APPLICATION NO. | : 10/074841 | |
| DATED | : July 18, 2006 | |
| INVENTOR(S) | : Leonard Raymond Colavito et al. | |

It is certified that error appears in the above-identified patent and that said Letters Patent is hereby corrected as shown below:

In column 11, line 7, replace "$\geq$" with --$\leq$--.

Signed and Sealed this

Fourteenth Day of November, 2006